Sept. 25, 1962 E. H. DU BOIS ETAL 3,055,222
TIMER FOR PHOTOCOPY MACHINE
Filed Oct. 13, 1960 3 Sheets-Sheet 1

INVENTORS
EDGAR H. DU BOIS
ANTHONY J. MAZZIO
LOUIS G. BIRR
BY
Ooms, McDougall, Williams & Hersh
ATTORNEYS Sept. 25, 1962 E. H. DU BOIS ETAL 3,055,222
TIMER FOR PHOTOCOPY MACHINE
Filed Oct. 13, 1960 3 Sheets-Sheet 2

INVENTORS
EDGAR H. DU BOIS
ANTHONY J. MAZZIO
LOUIS G. BIRR
BY
Ooms, McDougall, Williams & Hersh
ATTORNEYS Sept. 25, 1962   E. H. DU BOIS ETAL   3,055,222
TIMER FOR PHOTOCOPY MACHINE
Filed Oct. 13, 1960   3 Sheets-Sheet 3

INVENTORS
EDGAR H. DU BOIS
ANTHONY J. MAZZIO
LOUIS G. BIRR
BY
Ooms, McDougall, Williams & Hersh
ATTORNEYS United States Patent Office 3,055,222
Patented Sept. 25, 1962

3,055,222
TIMER FOR PHOTOCOPY MACHINE
Edgar H. Du Bois and Anthony J. Mazzio, Chicago, and Louis G. Birr, Skokie, Ill., assignors to A. B. Dick Company, Chicago, Ill., a corporation of Illinois
Filed Oct. 13, 1960, Ser. No. 62,489
3 Claims. (Cl. 74—3.52)

This invention relates to a timer which is especially well adapted for use in connection with a photocopy machine, although the timer will find many other applications.

One object of the present invention is to provide a new and improved timer which is adapted to be driven by a motor that may already be provided for other purposes on a photocopy machine or the like.

A further object is to provide a new and improved timer which may advantageously be employed to energize the exposure lamps of a photocopy machine.

Another object is to provide a new and improved timer which is accurate and dependable and is easily adjusted to any desired interval within the capacity of the timer.

It is another object to provide a new and improved timer which is arranged so that the timed interval begins without substantial delay after the timer is actuated, and is terminated after a desired lapse of time, subject to the control of the operator.

Another object is to provide a new and improved timer which is easy to adjust and dependable in operation, yet is remarkably simple and low in cost.

Further objects and advantages of the present invention will appear from the following description, taken with the accompanying drawings, in which.

Figure 3:
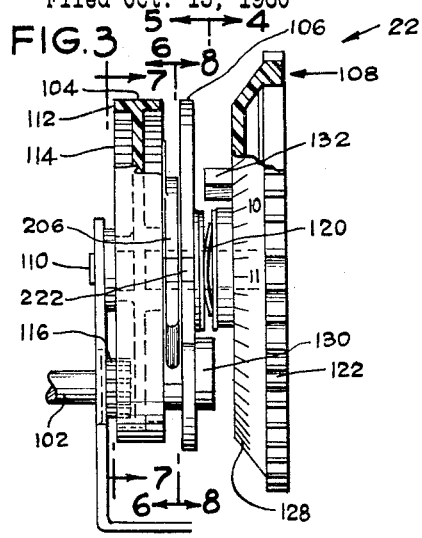
FIG. 3 is a fragmentary elevational view showing a portion of the timer, the view being partly in section along a line 3—3 in FIG. 2.
Figure 4:
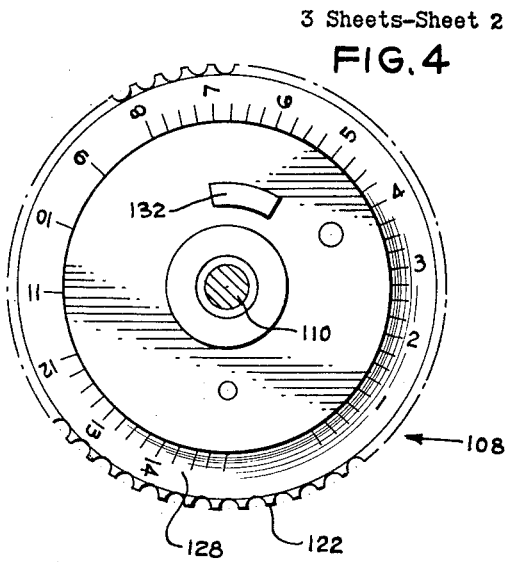
Figure 5:
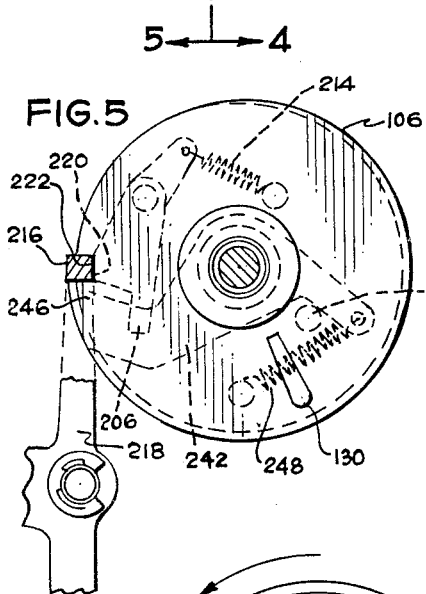

FIGS. 4, 5, 6, 7 and 8 are fragmentary sectional views, taken generally along lines 4—4, 5—5, 6—6, 7—7, and 8—8, all in FIG. 3.

Figure 9:
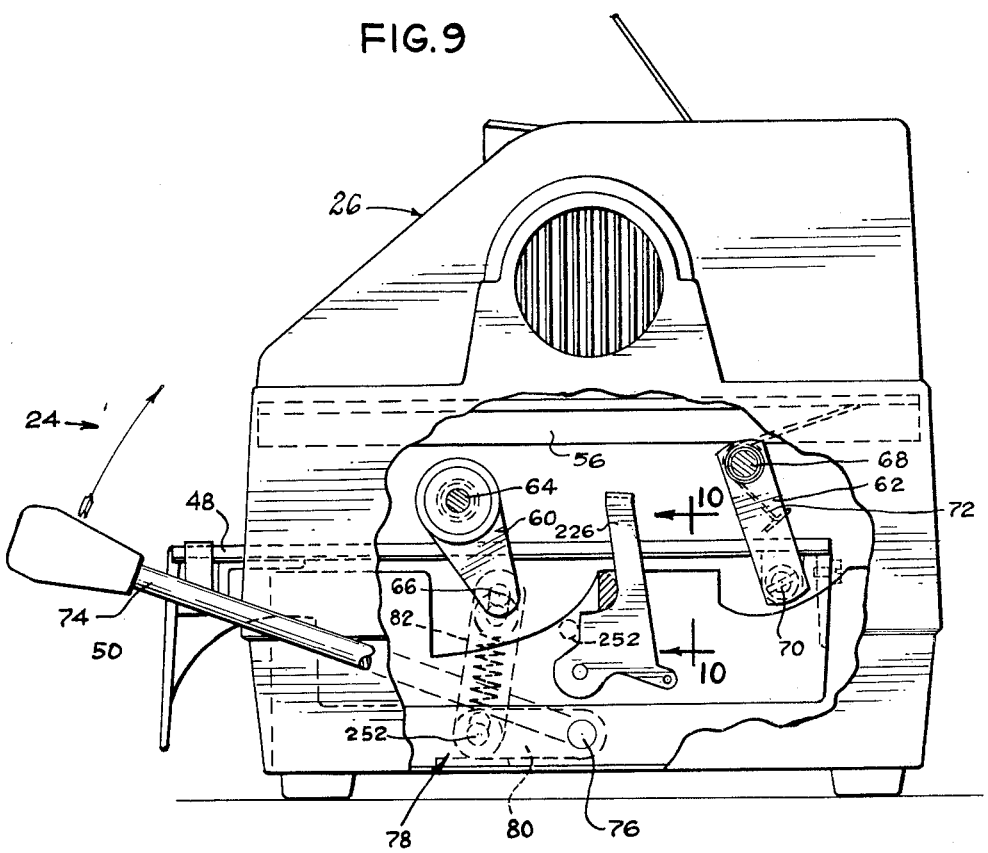

FIG. 9 is a side elevational view, with certain parts broken away and shown in section, to show additional details of the photocopy machine.

Figure 10:
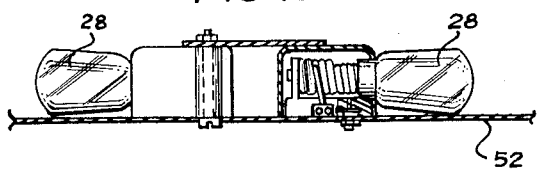

FIG. 10 is a fragmentary enlarged sectional view, taken generally along a line 10—10 in FIG. 9.

Figure 11:
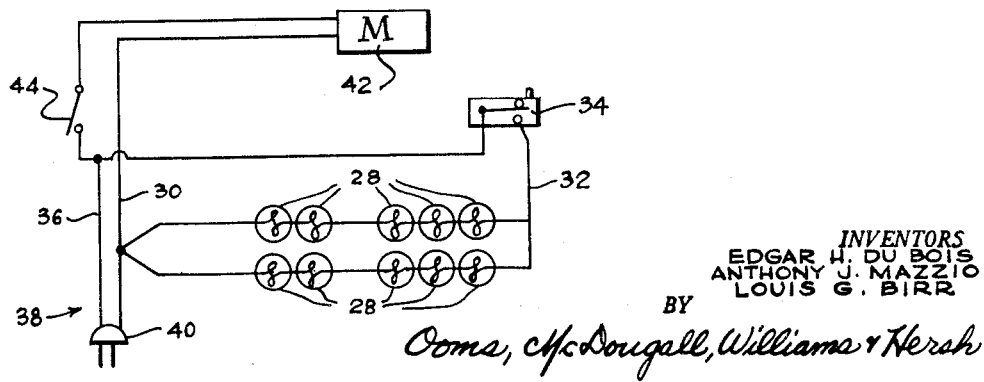

FIG. 11 is a circuit diagram of the photocopy machine.

As already indicated, the drawings illustrate a photocopy machine 20 embodying a timer 22 to be described as an illustrative embodiment of the present invention. The photocopy machine 20 may be of any suitable type. As shown, the photocopy machine is of the type adapted to make photocopies of documents, drawings, or the like by the reflex printing method, which will be well understood by those skilled in the art. Thus, the photocopy machine 20 comprises a lower section 24 for exposing the print paper, and an upper section 26 for developing the exposed print paper. The exposure section 24 comprises a plurality of lamps 28 (FIGS. 10 and 11) adapted to provide light for exposing the print paper. In this case, the timer 22 is employed to energize the lamps 28 for a desired interval which is adjustable by the operator. The timer assures accurate and consistent exposure of the print paper.

As shown in FIG. 11, all of the lamps 28 may be connected in a series-parallel arrangement between leads 30 and 32. The exact manner in which the lamps are connected is of no concern to the present invention. The timer 22 comprises a switch 34 which is connected between a lead 36 and the lead 32. The leads 30 and 36 constitute the wires of a power cord 38 which may have a power plug 40 thereon so that the lamps may be supplied with electrical power from an ordinary household or office receptacle. Closure of the switch 34 is effective to energize the lamps 28.

The timer 22 also comprises a motor 42 which is employed not only to operate the timer but also for other purposes in the photocopy machine, as will be indicated shortly. When the machine is in operation, the motor 42 runs continuously, but a switch 44 may be connected in circuit with the motor 42 and the power line 30 and 36 so that the motor may be turned off.

As shown, the exposure mechanism 24 comprises a flat horizontal platen 48 in the form of a plate made of glass, plastic or some other transparent or translucent material. The platen 48 is adapted to support the print paper and the document to be copied. It will be seen that the platen 48 is mounted on a movable platen frame 50. The lamps 28 are mounted on the platen frame 50, beneath the platen 48, and are supported by a plate 52 which is secured to the platen frame. Thus, the light from the lamps 28 passes upwardly through the platen 48, when the lamps are energized.

Above the platen 48, the exposure mechanism 24 is provided with a pressure pad 56 which may be made of sponge rubber or other soft resilient material so that the document and the print paper will be pressed firmly and evenly against the platen 48 when the platen 48 is moved upwardly against the pad 56.

In the illustrated arrangement, the platen frame 50 is supported for upward swinging movement on a system of front and rear links 60 and 62. Preferably, the mechanism employs a pair of the front links 60, one on each side of the platen frame 50. Likewise, it is preferred to employ a pair of the rear links 62, although it may be sufficient to employ only one rear link, on one side of the platen frame 50. As shown, each front link 60 is suspended from a pivot 64 and is connected to the platen frame 50 by means of a pivot 66. Similarly, each rear link 62 is suspended from a pivot 68 and is connected to the platen frame by a pivot 70. As shown, a spring 72 is provided to bias the rear link 62 in a clockwise direction. This has the effect of biasing the rear portion of the platen frame 50 downwardly.

The illustrated machine has an elongated operating arm or lever 74 which may be swung in a clockwise direction to move the platen 48 upwardly against the pressure pad 56. The hand lever 74 extends outwardly from a rotatable shaft 76. Toggle linkages 78 are connected between the shaft 76 and the platen frame 50 so that the clockwise rotation of the shaft 76 will raise the platen frame. As illustrated, each toggle linkage 78 comprises an arm 80 which is secured to the shaft 76 and is rotatable therewith. A compressible spring link 82 is pivotally connected between the outer end of the arm 80 and the platen frame 50. When the platen 48 is raised against the pressure pad 56, the links 80 and 82 pass over center, and the link 82 is compressed longitudinally so as to apply spring pressure to the platen.

When the platen 48 is moved upwardly against the pressure pad 56, the operation of the timer 22 is initiated, and the lamps 28 are energized. After the desired interval, for which the timer is set, the lamps 28 are de-energized. The exposed print paper may then be removed from the exposure mechanism 24.

The developing mechanism 26 may be of any suitable or desired construction. As shown, the developing mechanism comprises a trough 90 adapted to hold the developer solution. The exposed print paper is passed through the solution in the trough 90 and then is carried upwardly between a pair of squeeze rollers 92 and 94. Generally, the exposed print paper is fed through the developing mechanism along with a sheet of copy paper. The two sheets are pressed together face to face between the rollers 92 and 94, so that a positive copy is produced on the copy paper by the well-known diffusion transfer method.

In this case, the motor 42 is employed for the primary purpose of driving the squeeze rollers 92 and 94. As already indicated, the motor 42 is also employed to operate the timer 22. In this case, the motor 42 drives the squeeze rollers 92 and 94 at low speed through a reduction gear box 96 having a low speed output shaft 98. A gear train 100 is provided to connect the shaft 98 to the rollers 92 and 94. An output shaft 102 also extends in the opposite direction from the gear box 96, to operate the timer 22.

Figure 2:
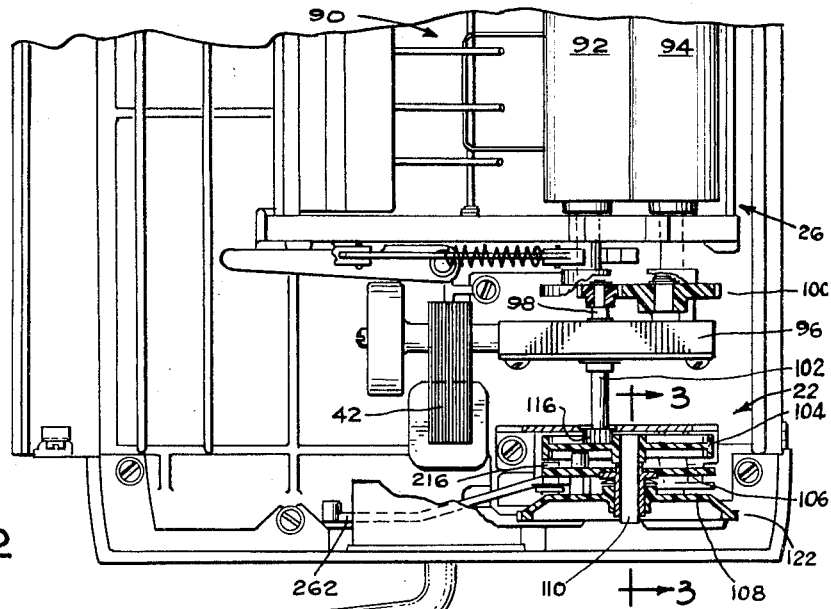
FIG. 2 is a fragmentary plan view of the photocopy machine with its top cover removed, the view being partly in section along a line 2—2 in FIG. 1.

It will be seen from FIGS. 2 and 3 that the illustrated timer 22 comprises first, second and third rotatable members or disks 104, 106 and 108, all of which are coaxially rotatable about a shaft 110. The first rotatable member 104 is arranged to be continuously driven by the motor 42. Thus, the member 104 is provided with a flange 112 having internal gear teeth 114 formed thereon. A pinion 116 is mounted on the end of the shaft 102 and is arranged to mesh with the internal gear teeth 114.

The second rotatable member 106 is adapted to be rotated through a single revolution when the timer is actuated. The manner in which this is accomplished will be described shortly. A frictional driving connection 120 is provided between the second and third rotatable members 106 and 108 so that the member 108 will rotate with the member 106. As shown, the driving connection 120 takes the form of one or more frictional clutch springs acting between the members 106 and 108. The frictional clutch 120 makes it possible to adjust the position of the third member 108 relative to the second member 106. In this way, the setting of the timer may be changed. Thus, the outer portion of the member 108 is in the form of a serrated knob 122 which is accessible through an opening 124 formed in the top cover 126 of the photocopy machine. A suitably graduated dial 128 is provided on the knob 122 to indicate the time interval for which the timer is set.

The time interval of the device controlled by the timer is initiated by the member 106 and is terminated by the member 108. Thus, an initiating formation or lobe 130 is formed on the member 106, while a terminating formation or lobe 132 is formed on the member 108.

Figure 1:
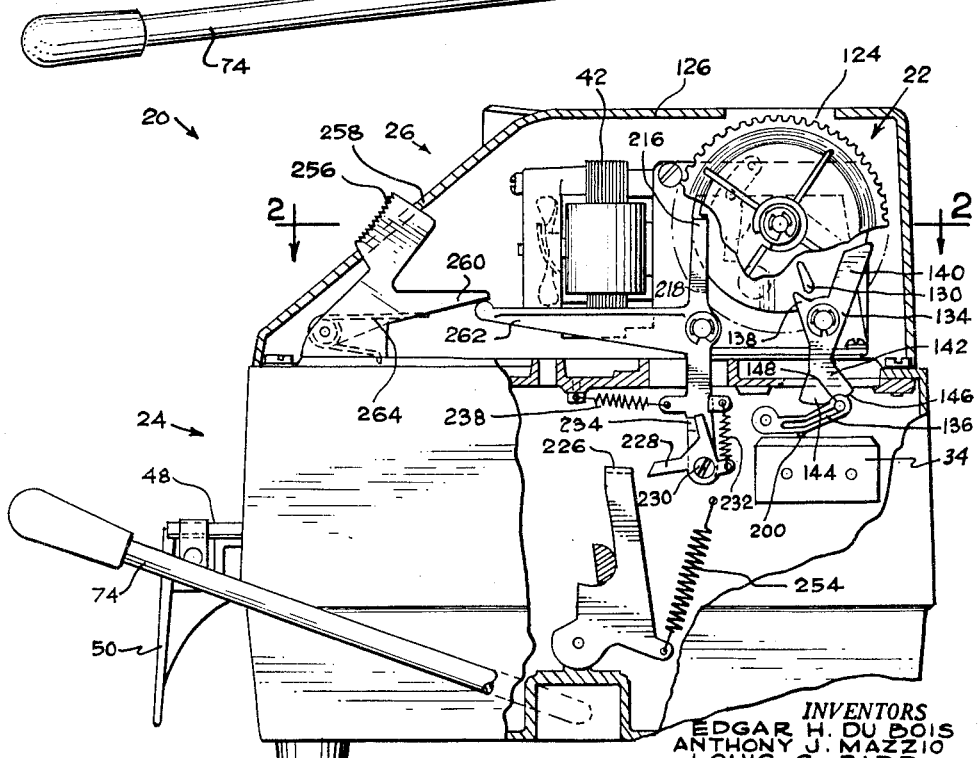
FIG. 1 is a side elevational view, partly in section, of a photocopy machine embodying a timer to be described as an illustrative embodiment of the present invention.

The lobes 130 and 132 are adapted to operate the lamp switch 34 through a linkage comprising levers 134 and 136. It will be seen that the lever 134 has a pair of fingers 138 and 140. Initially, the lobe 130 is positioned between the fingers 138 and 140. When the rotatable member 106 is rotated in a clockwise direction, as seen in FIG. 1, the lobe 130 pushes the finger 138 to the left, so that the lever 134 is swung counterclockwise. After the members 106 and 108 have rotated through the desired angle, the lobe 132 engages the finger 140 and pushes it to the right, so as to swing the lever 134 in a clockwise direction to its original position.

The lever 134 has a cam portion 142 with a high lobe 144 and a low portion 146. It will be seen that the lever 136 is provided with a cam follower or roller 148 which engages the cam 142. Initially, the follower 148 engages the low portion 146 of the cam. When the lever 134 is swung clockwise, the high lobe 144 engages the follower 198 so as to swing the lever 136 downwardly and depress the operating plunger 200 of the switch 34. This closes the switch and energizes the lamps 28. When the lever 134 is returned to its original position, the switch 34 opens, so that the lamps 28 are de-energized. The time interval for which the lamps are energized depends upon the angular relationship between the initiating and terminating lobes 130 and 132. This relationship is adjustable by rotating the member 108 relative to the member 106.

The member 106 is adapted to be driven through a single revolution by a clutch mechanism 204 including a clutch pawl 206 mounted on the rotatable member 106. A pivot pin 208 is formed on the member 106 to support the pawl 206. As shown to advantage in FIG. 6, the pawl 206 is engageable with internal clutch teeth 210 which are formed on a flange 212 on the continuously driven first member 104. A spring 214 is connected between the pawl 206 and the member 106 to bias the pawl outwardly toward the clutch teeth 210. When the pawl 206 engages the teeth 210, the second member 106 is driven by the first member 104.

However, the pawl 206 is initially held out of engagement with the driving or clutch teeth 210 by a brake or stop lug 216 which is formed on a lever 218. The lug 216 is movable between the members 104 and 106 and is engageable with a projecting portion 220 of the pawl 206. Initially, the stop lug 216 also engages a stop notch 222 which is formed in the periphery of the rotatable member 106. Thus, the lug 216 holds the member 106 against rotation.

Means are provided for momentarily disengaging the stop lug 216 from the notch 222 and the shoe portion 220 of the pawl 206. This is accomplished by means of another lever 226 which is engageable with an escapement pawl 228 on the lever 218. It will be seen that the pawl 228 is mounted on a pivot 230 at the lower end of the lever 218. A spring 232 is connected between the pawl 228 and the lever 218 to bias the pawl against a stop 234 on the lever 218. When the lever 226 is swung clockwise against the pawl 228, the pressure is taken up by the stop 234, so that the lever 218 is swung counterclockwise. Further movement of the lever 226 causes it to pass the pawl 228, whereupon the lever 218 is returned against the member 106 by a spring 238. The escapement pawl 228 yields to permit such return of the lever 218 past the lever 226.

The momentary withdrawal of the stop lug 216 from the notch 222 and the pawl 206 releases the member 106 for rotation, and permits the pawl 206 to engage the driving clutch teeth 210. Thus, clockwise rotation of the member 106 is initiated.

Figure 6:
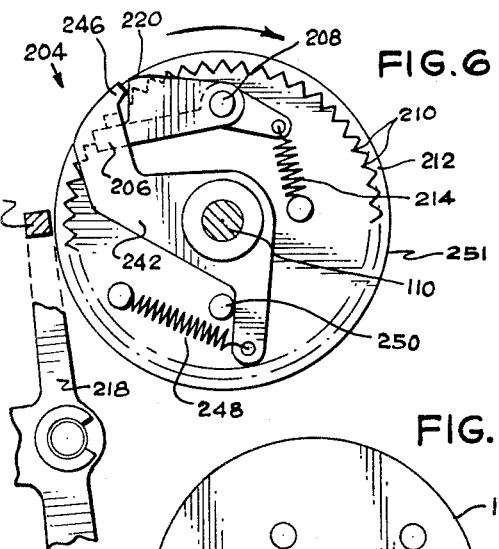
Figures 7, 8:
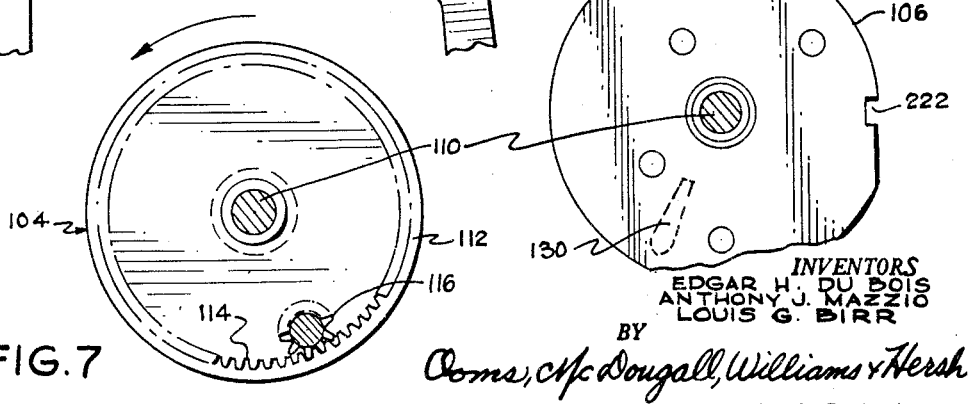

When the lever 218 returns against the member 106, the lug 216 might tend to re-enter the notch 222, but this is prevented by a shutter arm 242 which closes the notch 222 as soon as the lug 216 is withdrawn therefrom. It will be seen that the shutter arm 242 is mounted for rotation about the axis of the shaft 110. The shutter arm 242 has an outer portion 246 which initially engages the underside of the stop lug 216. A spring 248 is connected between the member 106 and the shutter 242, to bias the shutter portion 246 against the lug 216. When the lug 216 is withdrawn from the notch 222, the shutter portion 246 is released, whereupon the spring 248 moves the shutter 242 in a clockwise direction until it engages a stop pin 250 on the member 106. As shown in FIG. 6, the shutter portion 246 closes the notch 222 so that the lug 216 cannot re-enter the notch.

As already indicated, the member 106 rotates through one revolution. Meanwhile, the lug 216 engages the generally circular periphery 251 of the member 106. Near the end of the revolution, the outer portion 246 of the shutter again engages the lug 216 and is stopped so that further movement of the member 106 opens the slot 222. When the slot 222 comes into registration with the lug 216, the lug 216 re-enters the notch or slot 222. This arrests the rotation of the member 106 in its original position. The lug 216 engages the shoe portion 220 of the pawl 206 and disengages the pawl from the clutch teeth 210. Thus, the member 106 is brought to a stop in precisely its original position, after one full revolution. During such revolution, the lobes 130 and 132 turn the switch 42 on and off in the manner already described.

The operation of the timer 22 is initiated by the upward movement of the platen 48 against the pressure pad 56. Thus, the mechanism which operates the platen 48 is coupled to the lever 226 which actuates the timer 22. The lever 226 may be swung in a clockwise direction by a pin 252 on one of the toggle arms 80. Alternatively, the pin or other element for operating the lever 226 may be mounted directly on the platen frame 50. When the platen 48 is lowered, the lever 226 is returned in a counterclockwise direction by a biasing spring 254.

Sometimes it is desirable to actuate the timer 22 without moving the platen 48 to its fully raised position. For example, this may be desirable when the document being copied is one page in a relatively thick book or magazine which prevents the platen from being raised fully. Thus, the machine is provided with an auxiliary lever 256 which projects outwardly through an opening 258 in the top cover 126. The lever 256 has an arm 260 which is engageable with a generally horizontal arm 262 on the lever 218. When the lever 256 is pushed in a clockwise direction, the lever 218 is swung in a counterclockwise direction so as to disengage the stop lug 216 from the rotatable member 106. A spring 264 is provided to return the lever 256 in a counterclockwise direction when the lever is released.

It will be evident that the timer operates in a precise, dependable and foolproof manner. The time setting of the timer may be adjusted simply by rotating the knob 122 to any desired position relative to the rotatable disk or member 106. When the platen 48 is raised, the members 106 and 108 are rotated through one revolution. At the start of the revolution, the lobe 130 on the member 106 operates the switch 34 to its closed position so that the exposure lamps 28 are energized. At a later point in the revolution, after the desired time interval has elapsed, the lobe 132 opens the switch 34. After one revolution, the stop lug 216 enters the notch 222 and disengages the pawl 206 from the clutch teeth 210. Thus, the rotation of the member 106 is terminated.

Most of the components of the timer may be molded at low cost from plastic materials. Thus, the timer is economical as well as being precise and highly dependable.

Various modifications, alternative constructions and equivalents may be employed without departing from the true spirit and scope of the invention, as exemplified in the foregoing description and defined in the following claims.

We claim:
1. In a timer, the combination comprising a first rotatable member, means for continuously driving said first rotatable member, a second rotatable member coaxial with said first rotatable member, a third rotatable member coaxial with said first and second rotatable members, a first cam lobe on said second rotatable member, a switch operating member operable in one direction by said first cam lobe, a second cam lobe on said third rotatable member for operating said switch operating member in a direction opposite to said last mentioned direction, frictional driving means between said second and third rotatable members, said third rotatable member being adjustable in position relative to said second rotatable member by turning said third rotatable member while overcoming said frictional driving means, a stop notch in the periphery of said second rotatable member, an actuating lever having a stop lug receivable in said stop notch to hold said second rotatable member against rotation, driving teeth on said first rotatable member, a driving pawl on said second rotatable member and engageable with said teeth, said pawl having means engageable by said stop lug for disengaging said pawl from said teeth, a spring biasing said pawl toward said teeth, said lug being disengageable from said notch and simultaneously being disengageable from said pawl for releasing said second rotatable member for rotation and for releasing said pawl for movement against said teeth, a shutter movably mounted on said second rotatable member for closing said notch upon withdrawal of said lug therefrom, and means for returning said lug into said notch upon the completion of one revolution by said second rotatable member, said shutter having means engageable with said lug for opening said notch upon the completion of said revolution.

2. In a timer, the combination comprising first, second and third rotatable members, means for continuously driving said first rotatable member, means forming an adjustable driving connection between said second and third rotatable members so that the position of said third rotatable member relative to said second rotatable member may be varied, means on said second rotatable member for starting a timed interval upon rotation of said second rotatable member, means on said third rotatable member for terminating said timed interval after rotation of said second and third rotatable members through less than one revolution, a stop notch in the periphery of said second rotatable member, an actuating member having a stop lug receivable in said stop notch to hold said second rotatable member against rotation, driving teeth on said first rotatable member, a driving pawl on said second rotatable member and engageable with said teeth, said pawl having means engageable by said stop lug for disengaging said pawl from said teeth, a spring biasing said pawl toward said teeth, said lug being disengageable from said notch and simultaneously being disengageable from said pawl for releasing said second rotatable member for rotation and for releasing said pawl for movement against said teeth, a shutter movably mounted on said second rotatable member for closing said notch upon withdrawal of said lug therefrom, and means for returning said lug into said notch upon the completion of one revolution by said second rotatable member, said shutter having means engageable with said lug for opening said notch upon the completion of said revolution.

3. In a timer, the combination comprising first, second and third rotatable members, means for continuously driving said first rotatable member, means forming an adjustable driving connection between said second and third rotatable members so that the position of said third rotatable member relative to said second rotatable member may be varied, starting and stopping means on said second and third rotatable members for starting and stopping a timed interval upon rotation of said second rotatable member, said interval being adjustable by varying the position of said third rotatable member relative to said second rotatable member, a first stop element on said second rotatable member, an actuating member having a second stop element thereon engageable with said first stop element to hold said second rotatable member against rotation, disengageable clutch means connected between said first and second rotatable elements for selectively driving said second rotatable member, said clutch means including a clutch operating member movably mounted on said second rotatable member, said clutch operating member having means engageable by said second stop element for disengaging said clutch means when said second stop element is engaged with said first stop element, said second stop element being disengageable from said first stop element and simultaneously being disengageable from said clutch operating member for releasing said second rotatable member for rotation and simultaneously engaging said clutch means, a shutter movably mounted on said second rotatable member for moving between said first and second stop elements upon disengagement of said second stop element from said first stop element, and means for returning said second stop element into engagement with said first stop element upon the completion of one revolution by said second rotatable member, said shutter having means engageable with said second stop element for moving said shutter relative to said second rotatable member to expose said first stop element upon the completion of said revolution.

References Cited in the file of this patent

UNITED STATES PATENTS

| | | |
|---|---|---|
| 2,355,779 | Burleigh | Aug. 15, 1944 |
| 2,904,110 | Eggen | Sept. 15, 1959 |